United States Patent
Shaughnessy

(10) Patent No.: US 7,219,618 B1
(45) Date of Patent: May 22, 2007

(54) WATER-WHEEL BATHTUB FLOAT ALARM

(75) Inventor: John Henry Shaughnessy, Dalton, MA (US)

(73) Assignee: John Shaughnessy, Dalton, MA (US)

( * ) Notice: Subject to any disclaimer, the term of this patent is extended or adjusted under 35 U.S.C. 154(b) by 0 days.

(21) Appl. No.: 11/299,325

(22) Filed: Dec. 12, 2005

(51) Int. Cl.
*G01F 1/07* (2006.01)

(52) U.S. Cl. ............... 116/110; 116/228; 116/DIG. 24; 116/DIG. 7; 446/166

(58) Field of Classification Search ............... 116/110, 116/109, 111, 227, 228, 229, DIG. 7, DIG. 24; 446/166
See application file for complete search history.

(56) References Cited

U.S. PATENT DOCUMENTS

| | | | | |
|---|---|---|---|---|
| 139,072 | A * | 5/1873 | Mangold | 116/110 |
| 256,868 | A * | 4/1882 | Zanetti | 446/166 |
| 1,045,294 | A * | 11/1912 | Jamison | 116/110 |
| 1,477,558 | A * | 12/1923 | Hackett | 415/159 |
| 1,532,604 | A * | 4/1925 | Schmitz | 116/109 |
| 2,411,457 | A * | 11/1946 | Patterson | 116/109 |
| 3,116,695 | A * | 1/1964 | Faller | 446/166 |
| 3,425,152 | A * | 2/1969 | Foulkes | 446/166 |
| 3,665,638 | A * | 5/1972 | Weistrop | 446/166 |
| 4,080,985 | A * | 3/1978 | Eagle | 137/429 |
| 4,757,305 | A * | 7/1988 | Peso | 116/110 |
| 5,006,834 | A * | 4/1991 | Fountain | 116/229 |
| 7,068,175 | B1 * | 6/2006 | Pennington | 340/623 |

* cited by examiner

*Primary Examiner*—Richard Smith
*Assistant Examiner*—Travis Reis

(57) ABSTRACT

An alarm Abstract is provided for a bathtub and includes a method for attaching to a wall of the bathtub, one being a suction cup. A float assembly is supported by the alarm housing to engage the alarm system. To use the alarm apparatus of the invention in a bathtub, one of the three attachment methods is used to secure the housing to the wall of the bathtub. The float is adjusted to the desired height. Water is added to the bathtub, which turns a waterwheel, and when the water level lifts the float assembly a sufficient amount, the alarm system is activated and sounds a warning alarm. The alarm system includes a waterwheel that's is spinning, a thin flat plastic bar that is attached to the float. The float raises the thin plastic bar into the waterwheel thus making a loud clicking sound.

4 Claims, 2 Drawing Sheets

WATER-WHEEL BATHTUB FLOAT ALARM

BACKGROUND OF THE INVENTION

1. Field of the Invention

The present invention relates generally to alarm devices and, more particularly, to an alarm especially adapted for use in a bathtub to prevent an overflow of water from the bathtub.

2. Description of the Prior Art

The potential problem of water overflowing from the bathtub is a well-known problem. Expensive water damage to floors and ceilings can quickly result when a bathtub overflows. Another problem is a loss of expensive hot water and the loss of an increasingly expensive natural resource "water"; the main cause of bathtub overflows is "human beings"; and their inabilities to do other tasks and still focus on the bathtub being filled. In this respect throughout the years a number of innovations have been developed relating to alarms to warn of potential bathtub overflow, and the following U.S. patents are representative of some of those innovations: U.S. Pat. Nos. 4,258,444, 4,757,305, 4,771,272, 5,894,611, and 6,160,482.

In general they all rely on battery power and some form of electrical switch that is made up, when water comes in direct contact with electrical probes or when water raises a float and closes a switch. The main problems that all of the forgoing body of prior art share, battery power is limited and needs to be replaced, the bathtub is a hostile environment for electrical components, all of them have delicate components that would fail if they were dropped or subjected to bathtub environment for any length of time.

Still other features would be desirable in a tub alarm apparatus. For example tubs come in a variety of shapes and sizes. In this respect, it would be desirable if a bathtub alarm apparatus were provided with different ways for supporting the apparatus on a wall of a tub.

Thus, while the forgoing body of prior art indicates it to be well known to use an alarm to signal high water in a bathtub, the prior art described above does not have the following combination of desirable features: (1) Still another feature would be desirable in a bathtub alarm apparatus utilizing the endless supply of energy of the water flow filling the tub to operate the alarm system. (2) Still another feature would be desirable in a bathtub alarm system for example there are only two moving parts the waterwheel and the float (3) Still another feature would be desirable in the bathtub alarm simplicity in its design making it inexpensive to manufacture. (4) Still another feature this alarm apparatus will withstand a lot more abuse. (5) Still another feature has an easy method for attaching it to the tube wall. (6) Still another feature the apparatus is transparent making it easy to adjust and test; The foregoing desirable designs are provided by the unique bathtub alarm apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an alarm for a bathtub and includes a methods for attaching it to a bathtub wall with a suction cup. A frame that is connected to the attaching system a waterwheel that is attached to the frame and a float that is attached to the frame. To use the alarm apparatus of the invention, the apparatus is mounted to the tub wall with a suction cup, the apparatus is adjusted so the water coming out of the fill spout will hit the waterwheel and spin it, the float is now adjusted to the desired height of bathtub water level. Water is then added both filling the bathtub and spinning the waterwheel and when the bathtub water lifts the float a sufficient amount, the float rod comes in contact with the spinning waterwheel thus creating sounds that is the warning alarm.

The alarm system includes a waterwheel, a float connected to the main frame a suction cup attaching the frame to a tub wall.

The waterwheel spines freely on a shaft, a float is attached to a rod the slides inside of a tube mounted on the frame, at one end of the float rod is a float at the other end is a thinned paddle that makes a sound when it comes in contact with the spinning waterwheel.

The method for attaching the waterwheel float alarm
1. A suction cup.

The alarm suction cup is mounted to the main frame of the bathtub alarm.

The above description sets forth rather broadly the more important features of the present invention in order that the detailed description thereof that follows may be better understood, and in order that the present contributions to the art may be better appreciated, There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangement of the components set forth in the following description or illustrated in the drawings. The invention is capable of other embodiments and of being practiced and carried out in various ways. Also it is to be understood, that the phraseology and terminology employed herein are for the purpose of description and should not be regarded as limiting.

As such, those skilled in the art will appreciate the conception, upon which disclosure is based, may readily be utilized as a basis for designing other structures, methods, and systems for carrying out the several purposes of the present invention. It is important, therefore, that the claims be regarded as including such equivalent constructions insofar as they do not depart spirit and scope of the present invention.

It is therefore an object of the present invention to provide a new tub alarm apparatus, which has all the advantages of the prior art and none of the disadvantages.

It is another object of the present invention to provide a new tub alarm apparatus, which may be easily and efficiently manufactured and marketed.

It is a further object of the invention to provide a new alarm apparatus is of durable and reliable construction.

An even further of the present invention is to provide a new tub alarm apparatus which is susceptible of a low cost of manufacturing with regard to both materials and labor, and which accordingly is then susceptible of low prices of sale to the consuming public, thereby making such tub alarm apparatus available to the buying public.

Still yet a further object of the present invention is to provide a new and improved tub alarm apparatus which does not take up floor space adjacent to the bathtub wall.

Still yet another object of the present invention is to provide a new tub alarm apparatus which does not have substantial portions of the device immersed in bathtub water prior to the water level reaching an undesirable level in the bathtub.

Yet another object of the present invention is to provide a new bathtub alarm apparatus that includes a water float that is connected directly to an alarm unit.

And one other object of the present invention is to provide a new bathtub alarm apparatus that operates on the water flowing into the bathtub for its energy thus making it more reliable than all other prior art combined.

These together with still other objects of the invention, along with various features of novelty which characterize the invention, are pointed out with particularity in the claims annexed to and forming a part of this disclosure. For better understanding of the invention, its operating advantages and specific objects attained by its uses, reference should be had to accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to drawings, a new and improved tub alarm apparatus embodying the principles and concepts of the present invention will be described.

Figure 1:
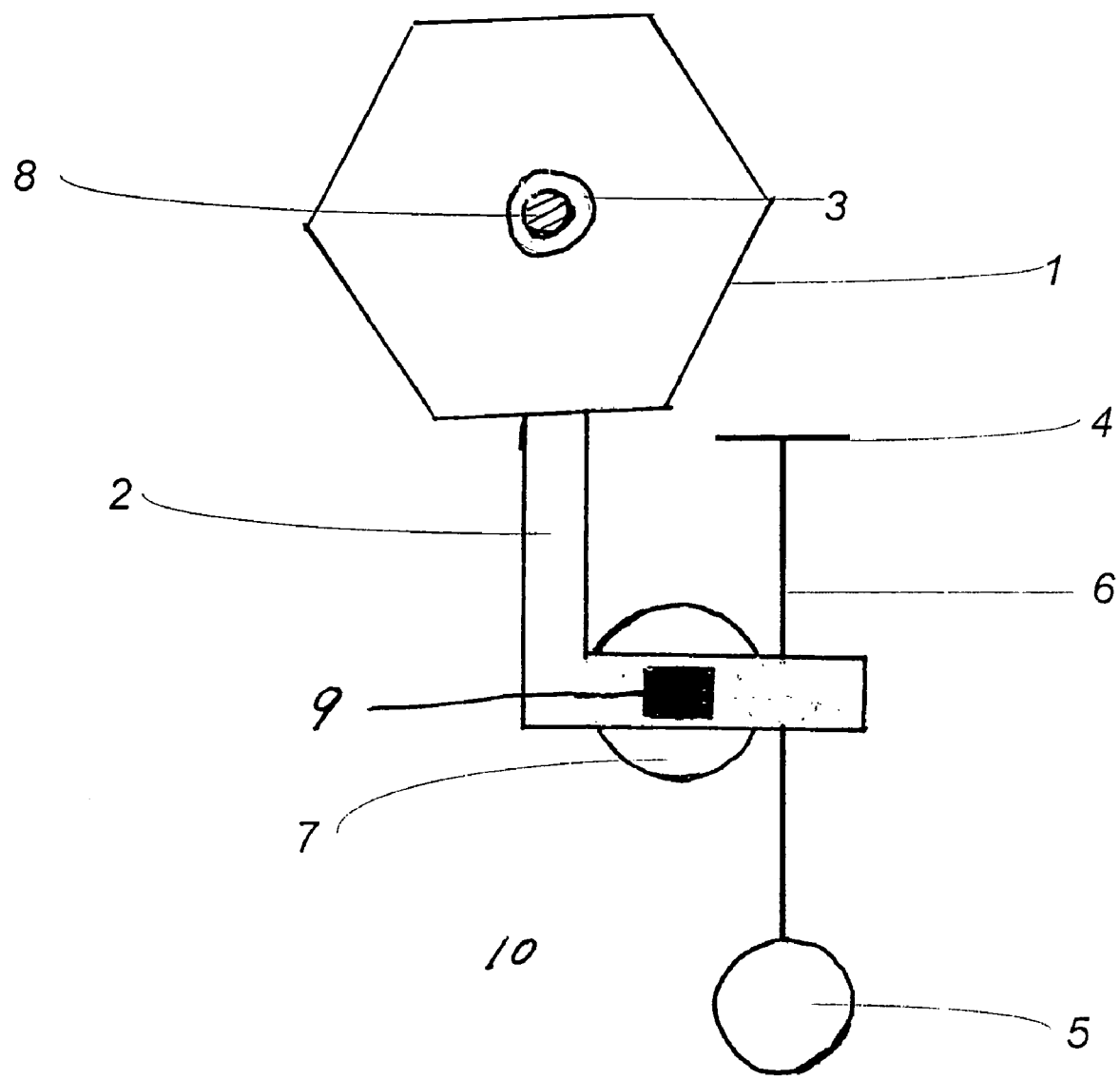
FIG. 1 is an enlarged perspective front view showing a preferred embodiment of the tub alarm apparatus of the invention.
Figure 2:
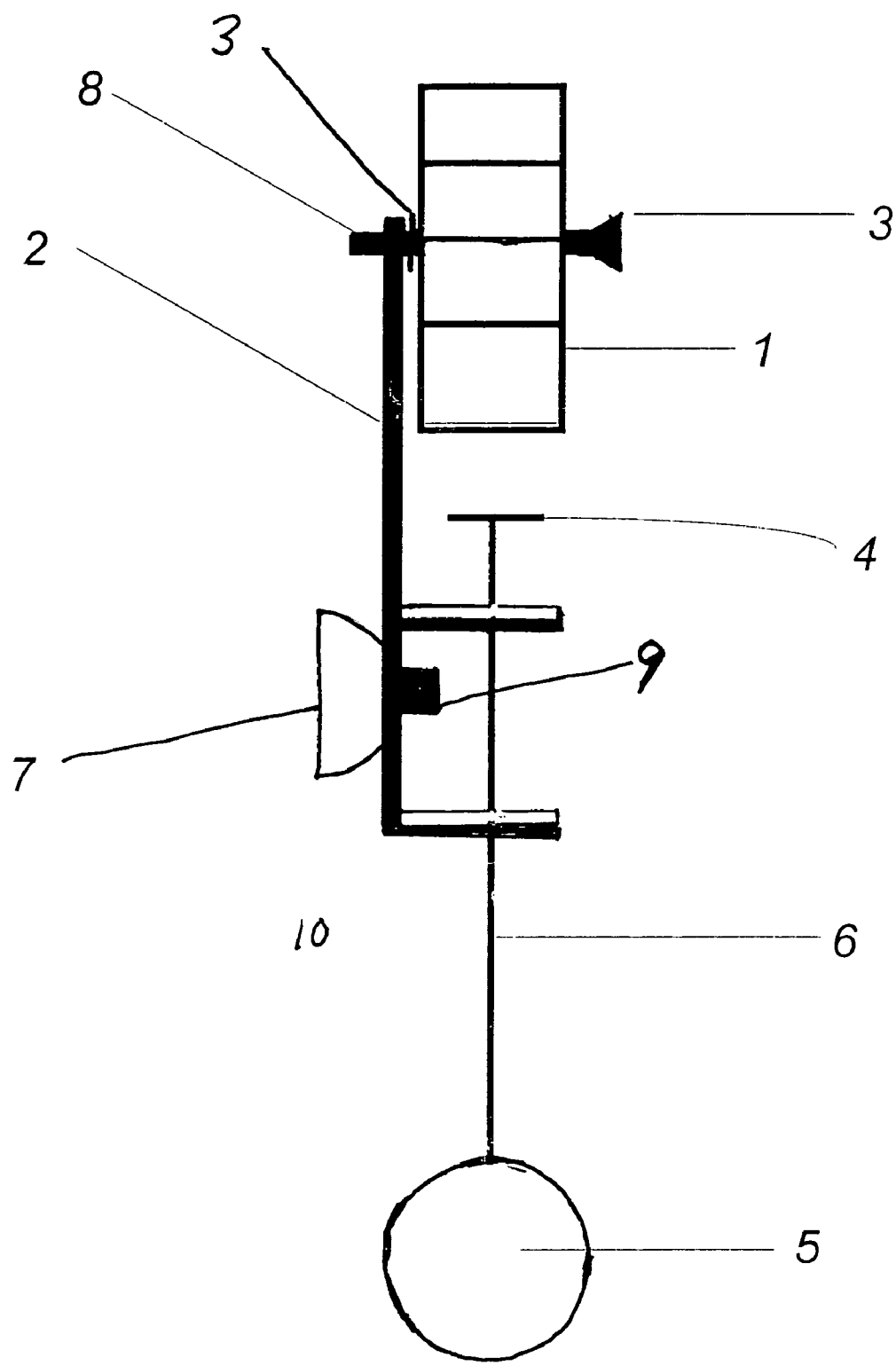
FIG. 2 is an enlarged side view of the embodiment of the tub alarm apparatus shown in FIG. 1

Turning to FIGS. 1–2, there is shown an exemplary embodiment of the tub alarm apparatus of the invention generally designated by reference numeral 10 in its preferred form, tub alarm apparatus 10 is provided for a liquid container and includes a suction cup 7 for attaching to a bathtub wall. An alarm housing 2 is attached to square portion of the suction cup 9. A float assembly 4, 5, & 6, is supported by the alarm housing 2. A waterwheel 1 is supported by a round axel 8. A axel adjuster 3 is supported by the axel 8 The axel adjusters are used to adjust the waterwheel 0 under the flow of water coming out of a bathtub spout.

To use the apparatus 10 of the invention in a bathtub, a desired water fill level for the bathtub is first determined. Then, the suction cup 7 is attached to the tub wall at a height which is in accordance with the predetermined water fill level. The bathtub water supply is turned on. The flowing water comes in contact with the waterwheel 1 which starts to turn it. The water level starts to rise. When the water level rises up to the float 5 it begins to raise the float shaft towards to spinning waterwheel 0 eventually the water level raises high enough that float disc 4 comes in contact with the spinning waterwheel 1 emits an audible alarm signal which warns that the water level in the bathtub has reached the predetermined level. The audible alarm signal alerts a nearby person that the water level in the bathtub is at the desired level and that, without intervention, the bathtub will overflow in due course.

When the person shuts the water supply valve off to the bathtub the waterwheel 0 stops spinning thus stops hitting the float disc 4 and ceases emitting an audible signal. To remove the alarm apparatus 10 from the bathtub, the suction cup 7 is simply disconnected from the bathtub wall.

The components of the tub alarm apparatus of the invention can be made from inexpensive and durable metal and plastic material.

As to the manner of usage and operation of the instant invention, the same is apparent from the above disclosure, and accordingly, no further discussion relative to a manner of usage and operation needed be provided.

It is apparent from the above that the present invention accomplished all of the objects set forth by providing a new and improved tub alarm apparatus that is low in cost, relatively simple in design and operation, and which may advantageously be used without taking up floor space adjacent to the bathtub. With the invention, a tub alarm apparatus is provided which does not have substantial portions of the device immersed in bathtub water prior to the water level reaching a undesirable level in the bathtub. With the invention, a tub alarm apparatus is provided which includes a water float that is connected directly to an alarm unit With the invention, a tub alarm apparatus is provided which employs a suction cup support for supporting on a wall of a bathtub.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, material, shape, form, function and manner of operation, assembly and use.

Hence, the proper scope of the present invention should be determined only by the broadest interpretation of the appended claims so as to encompass all such modification as well as all relationships equivalent to those illustrated in the drawings and described in the specification.

Finally, it will be appreciated that the purpose of the annexed Abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which is measured by the claims, nor is it intended to be limited as to the scope of the invention in any way.

What is claimed as being new and desired to be protected by Letters Patent of the United States is as follows:

1. An alarm apparatus for a liquid container, comprising:
    a suction cup for attaching to a wall of the liquid container,
    an alarm housing attached to a top portion of said suction cup,
    an axel attached to said housing, a waterwheel attached to said axel, and
    a float assembly supported by slots provided on arms connected to the housing perpendicularly for activating said alarm apparatus,
    wherein said float assembly includes:
    a float with a rod connected to said float, said rod being perpendicular to said arms a disc below and in the same plane as the waterwheel, connected to a top end of said rod;

wherein as a liquid flows over said waterwheel and into said container, said waterwheel turns upon said axel;

and wherein said float rises as said liquid rises in said container, bringing said disc into contact with said waterwheel to create an alarm noise.

2. The apparatus of claim 1 wherein said container is a bathtub.

3. The apparatus of claim 1 wherein said alarm housing arm slots permit free movement of said float rod.

4. The apparatus of claim 1 comprising: an axel cap attached to said axel.

\* \* \* \* \*